US008934884B2

(12) United States Patent
Gustafsson et al.

(10) Patent No.: US 8,934,884 B2
(45) Date of Patent: Jan. 13, 2015

(54) METHOD AND DEVICE FOR INDOOR POSITION RESOLUTION

(71) Applicants: Fredrik Gustafsson, Linkoping (SE); Christian Lundquist, Linkoping (SE); David Tornqvist, Linkoping (SE); Per Skoglar, Linkoping (SE); Jonas Callmer, Linkoping (SE)

(72) Inventors: Fredrik Gustafsson, Linkoping (SE); Christian Lundquist, Linkoping (SE); David Tornqvist, Linkoping (SE); Per Skoglar, Linkoping (SE); Jonas Callmer, Linkoping (SE)

(73) Assignee: SenionLab AB, Linkoping (SE)

( * ) Notice: Subject to any disclaimer, the term of this patent is extended or adjusted under 35 U.S.C. 154(b) by 329 days.

(21) Appl. No.: 13/624,299

(22) Filed: Sep. 21, 2012

(65) Prior Publication Data
US 2014/0087707 A1 Mar. 27, 2014

(51) Int. Cl.
*H04M 3/00* (2006.01)
*H04M 1/725* (2006.01)
*H04W 4/02* (2009.01)
*H04W 52/02* (2009.01)

(52) U.S. Cl.
CPC .......... *H04M 1/72572* (2013.01); *H04W 4/027* (2013.01); *H04W 52/0254* (2013.01)
USPC .... 455/418; 455/427; 455/456.1; 342/357.31

(58) Field of Classification Search
USPC .......................... 455/427, 456.1, 456.6, 12.1; 342/357.31, 463, 357.27; 701/470, 701/408, 434; 340/539.11, 539.13; 382/113
See application file for complete search history.

(56) References Cited

U.S. PATENT DOCUMENTS

| | | | |
|---|---|---|---|
| 7,039,421 B2 * | 5/2006 | Couronne et al. | 455/456.1 |
| 2002/0163467 A1 * | 11/2002 | Martikka | 342/357.05 |
| 2004/0010368 A1 * | 1/2004 | Scott | 701/213 |
| 2006/0284857 A1 * | 12/2006 | Oh | 345/173 |
| 2008/0204322 A1 * | 8/2008 | Oswald et al. | 342/465 |
| 2009/0117917 A1 * | 5/2009 | Mukkavilli et al. | 455/456.1 |
| 2009/0303117 A1 * | 12/2009 | Boiero et al. | 342/357.09 |
| 2010/0201516 A1 * | 8/2010 | Gelvin et al. | 340/539.26 |
| 2013/0321208 A1 * | 12/2013 | Sathish et al. | 342/386 |
| 2013/0328720 A1 * | 12/2013 | Marshall et al. | 342/357.76 |

* cited by examiner

*Primary Examiner* — Mahendra Patel
(74) *Attorney, Agent, or Firm* — Miller, Matthias & Hull LLP

(57) ABSTRACT

The present invention relates to a system and method for managing energy consumption in a multi-sensor user-carried device during indoor navigation. In an embodiment of the invention, the device calculates a motion mode, a location mode, or an operational mode, each of which is used to modify sensor behavior, e.g., sampling rate, and/or CPU load, e.g., filtering and modeling complexity. The motion mode describes the manner in which the user is moving (standing still, walking, passive transport for example), the location mode describes a feature of the user's location (near level change or intersection for example), and the operational mode describes the manner in which the user is interacting with the device (holding and monitoring, holding and not monitoring, not holding for example).

12 Claims, 3 Drawing Sheets

METHOD AND DEVICE FOR INDOOR POSITION RESOLUTION

TECHNICAL FIELD

The present disclosure relates to techniques and equipment for determining a position of a user and, more particularly, to a method and a device for energy conservation when determining a position of the user within a building.

BACKGROUND

Traveling has always been important for people and there has always existed a need to find destinations smoothly, easily and time efficiently. The demand is emphasized by the enormous popularity of the Global Positioning System (GPS) as a tool to find a desired destination. While today's global navigation satellite systems (GNSS) are highly capable, they still only function reliably when the receiver is outdoors; detailed guidance ceases at the entrance to a building. From a technical standpoint, the reason for this gap in coverage is that the GNSS satellite signals are weak and cannot typically penetrate a building exterior and structure.

Nonetheless, there are still times when location guidance inside a building is needed. For example, with respect to larger buildings such as airports, university campuses, hospitals or shopping malls, a user may easily become lost or misdirected, and the need to find a desired destination within the building remains. Thus, with current technology, a traveler might easily find an airport, but cannot receive GPS assistance to find their way from the airport entrance to his or her terminal or gate.

There are two main approaches available for indoor navigation based on different information sources, namely landmark-based navigation and dead reckoning. In landmark-based navigation, indoor landmarks with known position are deployed in the indoor environment, and the user is equipped with a map of these landmarks. The localization algorithm consists in triangulation and trilateration based on detection of one or more of these landmarks. This includes fingerprinting of radio signal strength indications (RSSI) from WiFi, cell phone base stations, or other radio beacons. The advantages of landmark based navigation are that it provides robust, potentially quite accurate, drift-free localization. To realize the approach simple localization algorithms can be utilized, e.g., filter methods are not needed, but can be used to get smooth trajectories. The disadvantages of landmark based navigation are that it requires pre-installed infrastructure and tedious mapping. The approach is sensitive to modification of the mobile radio beacons, their position or other changes of the radio environment.

The other primary approach, dead-reckoning, is based on inertial measurements and map based corrections. The basic principle of dead-reckoning is to integrate speed and course changes to a global course and position. Since velocity and course rate are subject to offsets and disturbances, the integrated position will quickly drift away. An indoor map is then required to stabilize the solution to stay in a feasible set of indoor positions, and to provide feedback of the actual offset values. The advantage of dead-reckoning is that it is a general and well known principle that only involves sensors in the device and no infrastructure. The approach works well in indoor environments with a limited number of alternatives to move (the map is informative). The disadvantage of dead-reckoning is that it requires more complex algorithms, where filtering is required. The approach works less well in open indoor areas, where there is little information in the map. Further, drifts in the position estimate are common. These principles can be combined into one solution that potentially avoids all disadvantages, but such an approach faces many challenges and still requires a complex algorithm.

Nonetheless, since all indoor navigation algorithms require information from a radio receiver and/or inertial sensors, these devices need to be active during the entire time during which navigation occurs. This requires energy, and extensive use will drain the battery quickly. For this reason, a typical device hosting an indoor navigation algorithm is typically not designed for extended use, and the radio and the inertial sensors are not assumed to be active for longer periods, such as a longer visit at an airport, a fair or shopping mall. In the event that extended use is desired, power management is a crucial challenge.

It will be appreciated that this background section discusses problems and solutions noted by the inventors; the inclusion of any problem or solution in this section is not an indication that the problem or solution represents known prior art except as otherwise expressly noted. With respect to prior art that is expressly noted as such, the inventors' summary thereof above is not intended to alter or supplement the prior art document itself; any discrepancy or difference should be resolved by reference to the prior art document itself. It will be further appreciated that solving the noted problems, while desirable to the inventors, is not a limitation of the appended claims except where expressly noted, since the claimed invention is susceptible to a wide variation in implementation techniques.

SUMMARY

In an embodiment of the invention, the power consumption of the hardware is adjusted depending on the context. This context is determined by a mode, which may be labeled index, operating point, switch parameter, or similar. In a further embodiment of the invention, the mode is computed from sensor data either directly or indirectly using estimated position. The mode determines which sensors are to be used, and the period or next interval at which they will be sampled. The mode designation also affects the complexity and update rate of the algorithm in order to adapt the processor load. Finally, the mode can also control the screen with the graphical user interface.

The purpose of all these actions is to minimize the power and still have sufficient sensor information and computational resources for the indoor navigation system. By minimizing the power over small time intervals, the total energy is also minimized, saving battery power and enabling longer use of the device and the indoor navigation system. In an embodiment of the invention, three different modes are provided to guide the power management system. The first of these, a motion mode, characterizes the speed of the user, which includes standstill as a special case. A location mode characterizes important parts of the indoor environment that require special attention. Finally, an operating mode characterizes how the user currently interacts with the device hosting the indoor navigation system. These modes and exemplary embodiments of power management are described in greater detail in the detailed description.

Others features and advantages of various embodiments of the invention will become apparent from the following detailed description read in conjunction with the appended figures.

BRIEF DESCRIPTION OF THE DRAWINGS

Embodiments of the invention will be described in greater detail below with reference to the enclosed drawings, wherein.

DESCRIPTION OF EMBODIMENTS

Figure 1:
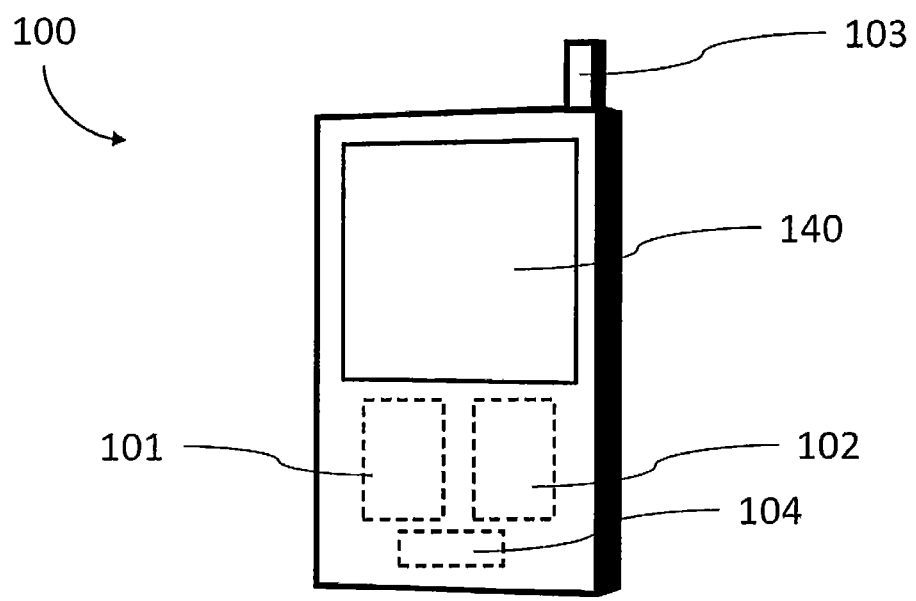
FIG. 1 is a schematic view of a user-carried device within which an embodiment of the invention may be implemented.

The present invention will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. In the drawings, like numbers refer to like elements.

In one implementation of a suitable user-carried device 100, a battery powered smart phone provides a platform having inexpensive yet reasonably high-quality sensors, e.g., accelerometers, magnetometers, gyroscopes and/or radio frequency receivers. Such a device is shown in FIG. 1. The illustrated user-carried device 100 includes a movement sensor 101, a direction sensor 102 and a display 140 among other features not shown such as the radio frequency components. The user-carried device 100 generally comprises a battery (not shown) to provide power. The user-carried device 100 may further comprise an antenna 103 for communication, e.g., with a central unit, with a cell tower, with local WiFi sources, and so on.

The user-carried device 100 further comprises a calculation unit 104. The calculation unit 104 is connected to the movement sensor 101 and the direction sensor 102. The calculation unit 104 may be a digital processor which operates by executing computer-executable instructions read from a non-transitory computer-readable medium such as a digital memory.

The calculation unit 104 is further connected to the display 140 for presenting an estimated position to the user. The calculation unit 104 performs the automated functions as described herein. The user-carried device 100 may comprise additional sensors (not shown) for detecting other properties in the building, e.g., chemical properties etc.

Figure 2:
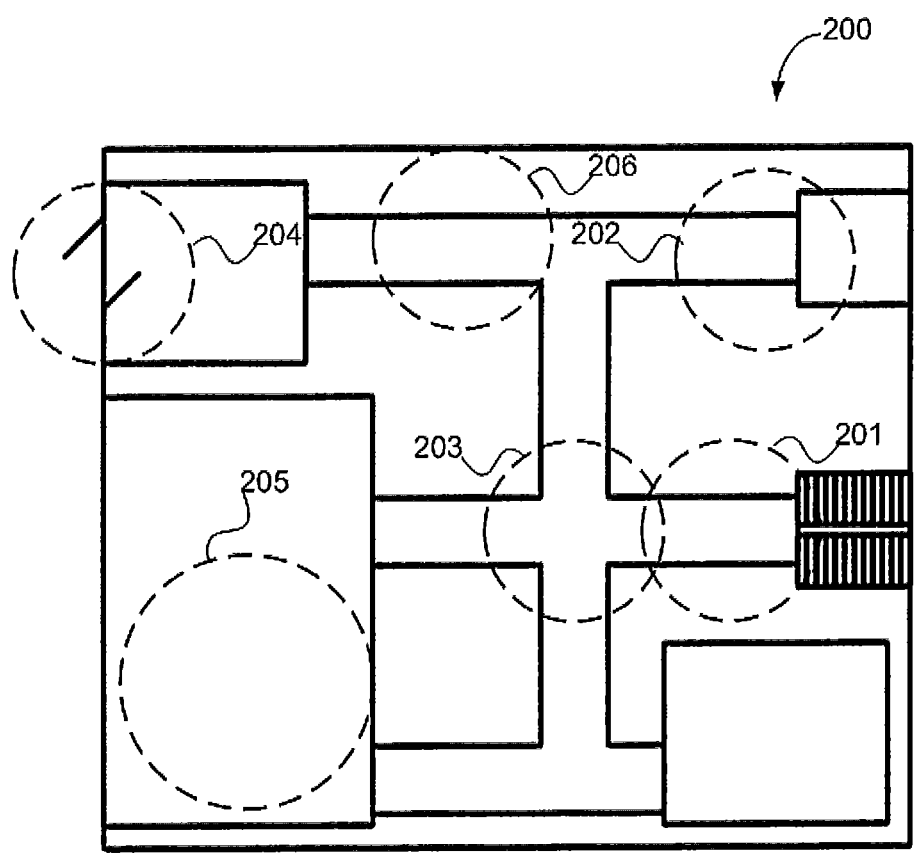
FIG. 2 is a simplified building diagram 200 showing a number of areas of significance within a building.

FIG. 2 is a simplified building diagram 200 showing a number of areas of significance within a building. The schematic shows a single floor, though it will be appreciated that each floor may have one or more areas of interest. It will be appreciated that the location mode to be discussed later herein is not limited to a particular set of types of areas.

In the illustrated embodiment, the exemplary areas include certain areas in a building that may be considered more critical than others. For example, area 201 is an area that is proximate to a staircase, while area 202 is proximate to an elevator, signifying the possibility of level change. Area 203 signifies an intersection in long corridors, signifying a localized opportunity to alter course or change direction. Similarly, area 204 signifies an area in close proximity to an entrance, indicating possible access GPS. Other sources of information may be area-specific as well, such as area 205, signifying an area close to a WiFi access point.

Other types of area designations may be used as well. For example, area 206 signifies an area in which magnetometer readings are reliable. As can be seen, the various areas 201, 202, 203, 204, 205, 206 need not be mutually exclusive, and may indeed overlap depending upon the building environment.

As noted above, it is an object of the invention to alleviate drawbacks with present devices with respect to power consumption during navigation. Furthermore, it is an object to manage the power consumption of a user carried device for positioning of a user inside a building.

According to a first aspect of the invention, these improvements are achieved by a method for managing the power consumption of a user carried device, wherein the user carried device is intended for indoor positioning and the user carried device is provided with a direction sensor, a movement sensor and a radio receiver. The method comprises determining the motion mode of the device based on the information received from at least one sensor, and controlling the sampling rate of at least one of the other sensors based on the determined motion mode. A used herein, a sensor is an electronic circuit that measures signals that vary with position and orientation. This includes inertial sensors (accelerometer, gyroscope), magnetometers ("compass"), radio receivers (WiFi, Bluetooth, GSM and other cellular networks, GPS and other global navigation satellite systems), light sensors, cameras, barometers, microphones, etc.

The motion mode can also control the CPU load by adapting the update rate of the indoor navigation method. For example, normally the user may expect a position update at least once per second, but if the position does not change or the user is not watching the display, the update frequency can be decreased. The complexity of the indoor navigation method can also be changed; some areas in the indoor environment are more challenging than other areas, and require more complex algorithms. Similar to the update rate, higher accuracy is demanded by a user watching the map continuously than by a user having their device in their pocket.

In an embodiment of the invention, a particle filter is used to process the sensor values to a position in the map. The number of particles (potential positions) in the filter determines the complexity and accuracy of the method, while the CPU load is proportional to the number of particles. More sophisticated motion models may be used for the dead-reckoning step in more challenging areas, for instance where there are known magnetic disturbances degrading the magnetometers. Also, frequency analysis to monitor vibrations is a CPU intensive operation that may be turned on in certain situations.

The motion mode can describe different situations or states of motion, such as standing still, in motion, and passive transportation. If the device is lying still on a table, or in the pocket of a person sitting still, then we have a situation of stand still. Stand still can be detected from small signal values from the inertial sensors, or small variations in the received radio signals. With respect to motion, the most common motion is walking, where the mode may also comprise the step frequency. Other motions such as running, crawling and other unusual gaits may be included here as well. Step detection is commonly based on monitoring events in the accelerometer or gyroscope signals, and these can also be used to classify the gait.

With respect to passive transportation, such as elevators, escalators, transportation bands, wheel chairs, Segways, etc., accelerometers can be used to sense the characteristic vibrations of such transportation devices and thus detect that the user is employing such transportation mechanisms. The current estimated position together with building information is also an important tool to determine the possibility that the user has entered an elevator, an escalator or a transportation band.

Knowing the motion mode gives an indication of the speed of the device, which is useful for deciding which sensor information is needed, how fast the sensors need to be sampled, and what CPU load is required. All these can be optimized to minimize power consumption in the CPU, sensors and display unit. In one embodiment, the update rate of the algorithm and sampling rate of the sensors are proportional to the step frequency. During stand still, most of the sensors need not be sampled at all. This means that those sensors can be turned off or deactivated. The advantage of turning off a sensor is that the power consumption of this sensor is reduced significantly. The sensor may be put in a stand-by mode to be able to be turned on again when required.

In addition to the motion mode as described above, a location mode is also used in an embodiment of the invention, with power management is based on the location mode. The location mode is derived from the position computed by the indoor navigation device and an indoor map with characteristics of the building. The location mode can describe a number of situations including, for example, an area with poor radio coverage. In such a location, there is little or no useful information in the signals from the radio receivers, so that these sensors can be turned off or used with a reduced sample rate without loss of information. Another location includes an area close to an entrance. To get a seamless transfer from indoor to outdoor navigation and vice versa, it is useful to turn on GPS receivers in the proximity to exits, and to turn on WiFi close to entrances. For instance, light sensors and microphones can be activated and used to detect the transfer from outdoor to indoor.

Another possible location is an area with many different movement directions, such as open squares and path intersections. Here, all or most available sensor information is needed. Conversely, in a long corridor without intersections, less information is needed. Another possibility is an area close to level change opportunities, i.e., staircases, elevators or escalators. In such areas it is crucial to quickly detect a level change. This can be achieved by maximizing the sampling speed of all sensors, or using dedicated sensors such as barometers. Another example is to use the accelerometers to sense the characteristic vibrations from an elevator or an escalator. As further examples, light sensors and microphones can be used to detect different conditions on different levels.

Another possible location is an area with little magnetic disturbance. Here the magnetometer can be used to determine the course, while the course estimate is otherwise based on the gyroscope only.

In addition to the motion and location modes, the device in an embodiment of the invention also supports an operational mode for power management. The operational mode of the device may include: (1) Handheld viewing mode, where maximum performance is required by the user, (2) Handheld non-viewing mode, where less accuracy is needed, and thus less requirement on the sensor information and algorithm performance, and (3) Pocket mode (including having the device stored in a bag), where the sampling rate of the sensors and update rate of the algorithm running on the CPU can be decreased.

The operational mode can be computed based on the gravity vector determined from the accelerometers. The gravity vector tends to be perpendicular (or 90 degrees rotated) to the motion direction when a user is watching the display. Also the gyroscope signals can be used, since the pendulum movement during a step cycle is larger for a device in a pocket or a bag compared to a handheld device being actively monitored by the user. If the screen is automatically or manually turned off, or if another application is started, then this also indicates a non-viewing mode. Furthermore, light sensors may be used to detect pocket mode.

Figure 3:
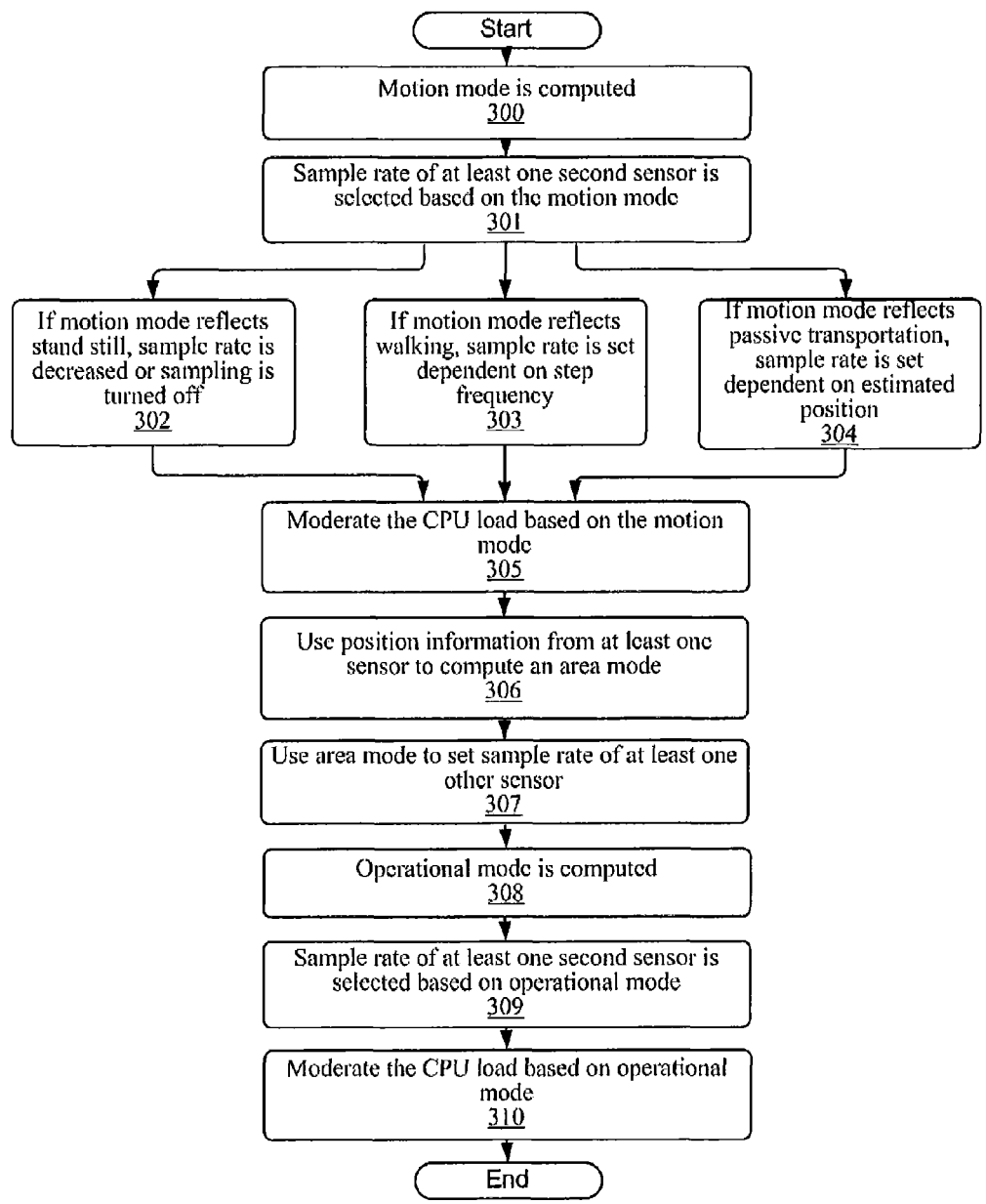
FIG. 3 is a flow chart showing an exemplary process for energy management in a portable battery-powered device for navigational assistance.

Having reviewed the various modes available, an exemplary manner of power consumption management will be discussed with reference to the flow chart of FIG. 3. At stage 300, using information from at least one sensor, a motion mode is computed. At stage 301, a sample rate of at least one second sensor is selected based on the motion mode. By way of example, the sensor used to detect the motion mode may be a step detector (accelerometer), and the determined motion mode then controls a radio receiver sampling rate. If the motion mode is "standing still", the radio receiver sample rate might be zero.

At stage 301, if the motion mode reflects stand still, the sample rate is decreased or sampling is turned off at stage 302. If the motion mode reflects walking, the sample rate is set to a value dependent on the step frequency at stage 303. Finally, if the motion mode reflects passive transportation, the sample rate is set to a value dependent upon the estimated position relative to a map of the building at stage 304.

In an embodiment of the invention, as noted above, the system controls parameters related to the CPU load of the indoor navigation system in a similar manner. There are a number of parameters that the system may set to affect CPU load depending upon the motion mode. These include the update rate in a filter that converts a stream of sensor measurements into a position, the model complexity of the model-based filter that converts a stream of sensor measurements into a position, and the accuracy of the numerical approximation provided by the filter that converts a stream of sensor measurements into a position. Thus, at stage 305, the system moderates the CPU load via one or more of the above.

At stage 306, the process uses position information from the localization algorithm using signals from at least one first sensor to compute a location mode, and at stage 307 uses the location mode to control the sample rate of at least a second sensor. In particular, some areas in a building are more critical (proximity to staircase/elevator, intersections in long corridors, etc) or enable other information sources (GPS close to entrances).

Thus, in an embodiment, the location mode reflects the coverage of radio transmitters. Alternatively, the location mode reflects the reliability of magnetometer readings, the number of possible movement alternatives in the environment, the possibility of receiving satellite signals (i.e., GPS signals), and the possibility of changing levels in the building. The location mode can then be used in stage 306 to control the CPU load by controlling sampling rates and sample processing rates as discussed above.

At stage 308, the system uses information from at least one sensor to compute an operational mode, which controls the sample rate of at least one second sensor at stage 309. The operational mode reflects the way in which the device is being operated by the user, and may indicate that the device is hand-held and monitored by the user, is hand-held but not monitored by the user, or the device is stored, e.g., in a pocket, and is not being monitored by the user. The determined operational mode can then be used in stage 310 to control the CPU load via changes in sampling rates and sample processing rates as discussed above.

In the drawings and specification, there have been disclosed preferred embodiments and examples of the invention and, although specific terms are employed, they are used in a generic and descriptive sense only and not for the purpose of limitation, the scope of the invention being set forth in the following claims.

The invention claimed is:

1. A method for managing power consumption of a portable battery-powered user carried device, wherein the user carried device includes a direction sensor, a movement sensor and a radio receiver and an application for using the sensors for indoor positioning of the user carried device, the method comprising:
   determining a motion mode based on the information received from a first sensor selected from the direction sensor, the movement sensor and the radio receiver, wherein the motion mode describes a type of motion exhibited by the user carried device; and
   based on the determined motion mode, controlling a sampling rate of a second sensor so as to reduce power consumption, the second sensor being selected from the direction sensor, the movement sensor and the radio receiver, the second sensor being different from the first sensor; and
   selecting at least one of an operational mode and a location mode to be determined; and
   determining the operational mode based on the information received from one of the sensors, wherein the operational mode identifies a manner in which the user is operating the user carried device, and based on the determined operational mode, controlling a sampling rate of one or more of the sensors so as to reduce power consumption; and
   determining the location mode based on the information received from one of the sensors, wherein the location mode identifies a location of the user, and based on the determined location mode, controlling a sampling rate of one or more of the sensors so as to reduce power consumption.

2. The method according to claim 1, wherein the step of controlling the sampling rate comprises controlling the sampling rate to zero.

3. The method according to claim 1, wherein the motion mode describes a step frequency.

4. The method according to claim 1, wherein determining the motion mode comprises determining that the user is standing still.

5. The method according to claim 1, wherein determining the operational mode comprises determining that the user carried device is held and monitored by the user.

6. The method according to claim 1, wherein determining the operational mode comprises determining that the user carried device is being held but not monitored by the user.

7. The method according to claim 1, wherein determining the operational mode comprises determining that the user carried device is not held by the user.

8. The method according to claim 1, wherein determining the motion mode further comprises determining that the user is about to enter or leave the indoor environment.

9. The method according to claim 1, wherein determining the motion mode comprises determining that the user may change floor.

10. The method according to claim 1, wherein the movement sensor is an inertial sensor.

11. The method according to claim 1, wherein the location mode identifies the location of the user as near a level change, near an intersection, near an entrance or near a wireless access point.

12. A method for managing power consumption of a portable battery-powered user carried device, wherein the user carried device includes a CPU, a direction sensor, a movement sensor and a radio receiver and an application for using the sensors for indoor positioning of the user carried device, the method comprising:
   determining a motion mode based on the information received from a first sensor selected from the direction sensor, the movement sensor and the radio receiver, wherein the motion mode describes a type of motion exhibited by the user carried device; and
   selecting one or more of an operational mode and a location mode to be determined; and
   determining the operational mode based on the information received from one or more of the sensors, wherein the operational mode identifies a manner in which the user is operating the user carried device; and
   determining the location mode based on the information received from one or more of the sensors, wherein the location mode identifies a location of the user; and
   based on the determined one or more of the motion mode, the operational mode, and the location mode, controlling a load on the CPU via a sampling rate of one or more of the sensors so as to reduce power consumption.

* * * * *